(12) United States Patent
Orlando et al.

(10) Patent No.: US 7,075,447 B2
(45) Date of Patent: Jul. 11, 2006

(54) SECURE TIME MEASUREMENT ELECTRONIC DEVICE AND METHOD

(75) Inventors: William Orlando, Peynier (FR); Jean Nicolai, Chateauneuf le Rouge (FR)

(73) Assignee: STMicroelectronics S.A., Montrouge (FR)

( * ) Notice: Subject to any disclaimer, the term of this patent is extended or adjusted under 35 U.S.C. 154(b) by 197 days.

(21) Appl. No.: 10/782,550

(22) Filed: Feb. 18, 2004

(65) Prior Publication Data

US 2004/0160311 A1 Aug. 19, 2004

(30) Foreign Application Priority Data

Feb. 19, 2003 (FR) .................................. 03 02035

(51) Int. Cl.
*G08B 1/00* (2006.01)

(52) U.S. Cl. .................. 340/653; 340/309.7; 368/109; 377/15

(58) Field of Classification Search .......... 340/309.16, 340/309.7, 653; 368/72, 98, 34, 46, 156, 368/160, 125, 168, 244, 109; 377/15, 20
See application file for complete search history.

(56) References Cited

U.S. PATENT DOCUMENTS

| | | | |
|---|---|---|---|
| 4,222,037 A * | 9/1980 | Schaap et al. | 340/309.7 |
| 4,337,529 A * | 6/1982 | Morokawa | 377/20 |
| 4,396,904 A * | 8/1983 | Hanaoka | 340/309.16 |
| 5,151,613 A * | 9/1992 | Satou et al. | 327/99 |
| 5,964,883 A | 10/1999 | Hewitt | 713/503 |
| 6,157,265 A * | 12/2000 | Hanjani | 331/49 |
| 6,252,826 B1 * | 6/2001 | Kaizu et al. | 368/120 |
| 6,529,447 B1 * | 3/2003 | Anil et al. | 368/156 |
| 6,553,466 B1 | 4/2003 | Friedman et al. | 711/152 |

* cited by examiner

*Primary Examiner*—Jeffery Hofsass
*Assistant Examiner*—Jennifer Mehmood
(74) *Attorney, Agent, or Firm*—Lisa K. Jorgenson; Robert Iannucci; Seed IP law Group PLLC

(57) ABSTRACT

An electronic circuit comprising a first counter clocked by a clock signal provided to have a first period and provided by an oscillator external to the circuit, and comprising a second counter clocked with a second period by an oscillator internal to the circuit, the second counter being reset each time the content of the first counter is a multiple of a first predetermined value, and a means for activating an alert signal when the second counter reaches a second predetermined value such that the product of the second predetermined value by the second period is greater than the product of the first predetermined value by the first period.

22 Claims, 1 Drawing Sheet

SECURE TIME MEASUREMENT ELECTRONIC DEVICE AND METHOD

BACKGROUND OF THE INVENTION

1. Field of the Invention

The present invention generally relates to systems for managing rights of use of digital files. Two types of rights of use can essentially be distinguished. A first so-called number-condition type of rights relates to the possibility of using a digital file a predetermined number of times. A second so-called time-condition type of rights relates to the possibility of using a digital file for a predetermined cumulated time or until a predetermined closing date.

2. Description of the Related Art

Among examples of application of the present invention, the management of rights of use of video files, of music (MP3), radio, or broadcasting files will be mentioned. The rights of use or of exploitation of contents managed by a time-condition system are most often direct rights of use, that is, rights of listening to an audio digital file or of screening a video sequence. Other exploitation rights such as the copying, the transfer, or the printing of digital data are generally managed by systems linked to number conditions rather than to time conditions. It is however not excluded for right management systems to use time conditions (for example, calendar) to set a time period during which the person entitled to the rights is allowed to copy, lend, transfer, or print a digital content.

FIG. 1 very schematically shows in the form of blocks an example of an integrated circuit enabling management of time-condition rights. The circuit comprises a functional block 4 (FUNCT) enabling reading of a memorized music file, for example, downloaded from means not shown. Block 4 is a synchronous block which operates at the rate of a clock signal CK. The frequency of signal CK, from which block 4 especially generates music signals, must be very accurate. For this reason, signal CK is generated by a quartz oscillator 6. In the state of the art, it is impossible to integrate such an oscillator in an integrated circuit, and oscillator 6 is external to circuit 2. A counter 8 (CNT1) clocked by clock signal CK, gives a time measurement. The music file that can be read by block 4 contains, for example, a closing date. Block 4 comprises means not shown to compare the closing date and content CNT of counter 8, and to enable reading of the music file until the content of counter 8 is greater than the closing date.

The time measurement represented by the content of counter 8 is only reliable if circuit 2 remains permanently in operation, and remains clocked by a clock signal CK, the frequency of which does not change. Known means enable verifying that circuit 2 remains in operation and permanently receives a clock signal, to forbid the reading of a music file memorized after a stopping of circuit 2 or of signal CK.

However, since quartz oscillator 6 is external to circuit 2, it remains possible, without stopping signal CK, to reduce its frequency between two uses of circuit 2 to delay, in unauthorized fashion, the time at which the content of counter 8 exceeds the closing date (be it by a calendar testing or by a maximum duration).

BRIEF SUMMARY OF THE INVENTION

An embodiment of the present invention provides an electronic circuit comprising reliable time measurement means, which are not likely to undergo pirating.

Another embodiment of the present invention provides a secure time-measurement method.

One embodiment of the present invention provides an integrated circuit comprising a first counter clocked by a clock signal provided to have a first period and provided by an oscillator external to the circuit, and comprising a second counter clocked with a second period by an oscillator internal to the circuit, the second counter being reset each time the content of the first counter reaches a first predetermined value, and a means for activating an alert signal when the second counter reaches a second predetermined value such that the product of the second predetermined value by the second period is greater than the product of the first predetermined value by the first period.

According to an embodiment of the present invention, the alert signal is activated when the current period of the clock signal is greater than a threshold period, the product of the second predetermined value by the second period being smaller than the product of the first predetermined value by the threshold period.

According to an embodiment of the present invention, the second period ranges between a lower limit and an upper limit, the product of the second predetermined value by the lower limit being greater than the product of the first predetermined value by the first period and the product of the second predetermined value by the upper limit being smaller than the product of the first predetermined value by the threshold period.

According to an embodiment of the present invention, the internal oscillator is formed of an odd number of series-connected inverters, the output of the last inverter being connected to the input of the first inverter.

According to an embodiment of the present invention, the second counter is reset by a comparator generating a reset signal each time the content of the first counter is a multiple of the first predetermined value.

According to an embodiment of the present invention, the first predetermined value is a power n of 2, and the comparator comprises an AND gate receiving on a first input the bit of rank n of the first counter and on a second input the inverse of the output of a D flip-flop, clocked by the quartz oscillator and receiving said bit of rank n as an input, the output of the AND gate generating the reset signal.

An embodiment of the present invention provides a circuit such as described previously enabling implementation of a predetermined function until the content of the first counter reaches a predetermined limit, or until the alert signal is activated.

An embodiment of the present invention provides a method of time measurement by means of a counter provided to be clocked with a first period by a quartz oscillator, comprising the steps of:

a) rating a second counter with a second period, the second counter being provided to be reset each time the content of the first counter is a multiple of a first predetermined value; and b) activating an alert signal when the second counter reaches a second predetermined value such that the product of the second predetermined value by the second period is greater than the product of the first predetermined value by the first period.

An embodiment of the present invention provides a method for managing a time-limited right of implementation of a predetermined function by measuring time according to the preceding method until the content of the first counter reaches a predetermined limit, or until the alert signal is activated.

The foregoing features and advantages of the present invention will be discussed in detail in the following non-limiting description of specific embodiments in connection with the accompanying drawings.

DETAILED DESCRIPTION OF THE INVENTION

Figure 1:
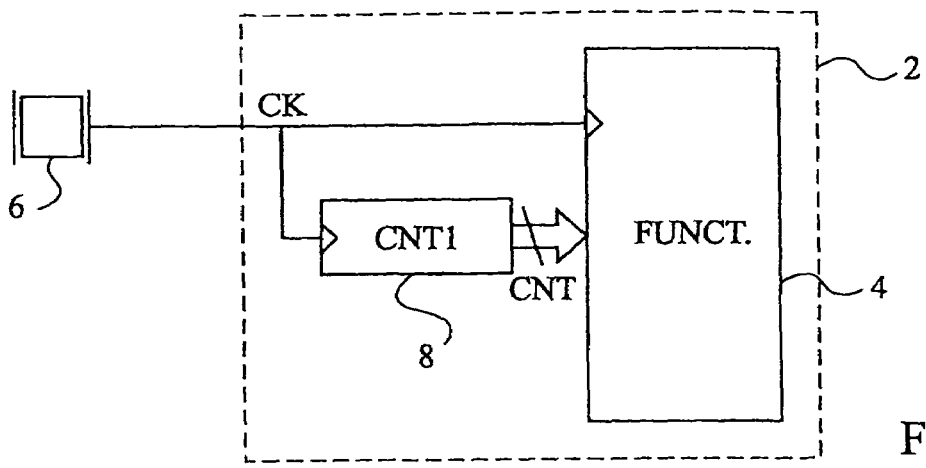
FIG. 1, previously described, schematically shows an example of an integrated circuit enabling management of time rights of a digital content.

Only those elements that are necessary to the understanding of the present invention have been shown. Same elements have been designated with same reference numerals in the different drawings.

Figure 2:
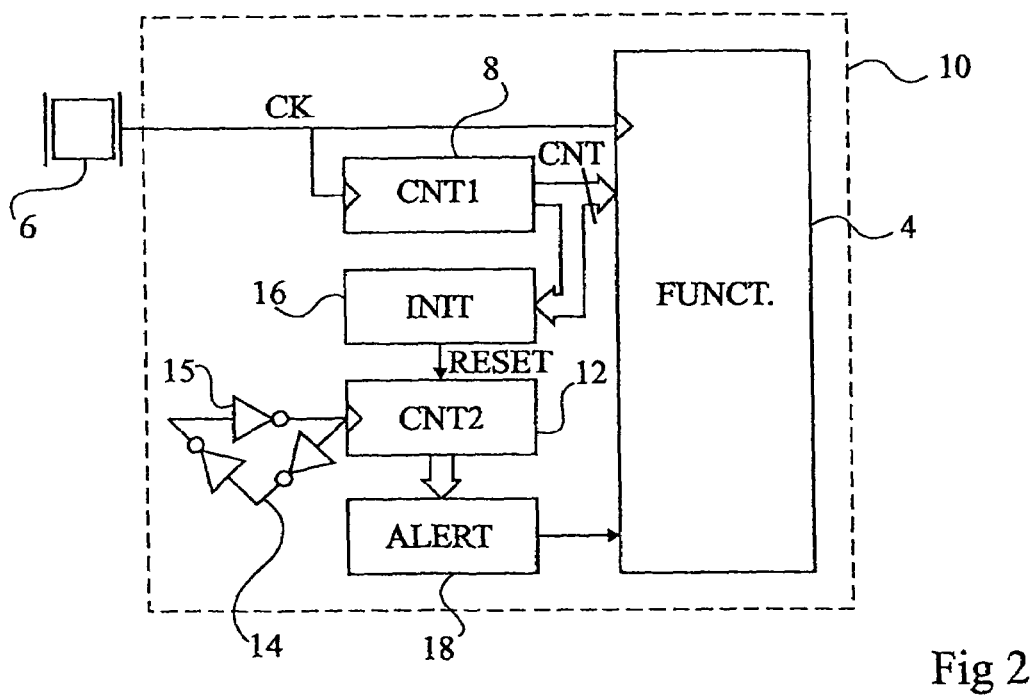
FIG. 2 schematically shows an integrated circuit according to an embodiment of the present invention enabling management of time rights of a digital content protected against piracy.

FIG. 2 very schematically shows in the form of blocks an integrated circuit 10 according to one embodiment of the present invention, enabling, like prior circuit 2, management of time rights relating to a digital file, for example, a music file. Circuit 10 comprises, like circuit 2, a functional block 4 (FUNCT) enabling reading of a memorized music file and receiving a clock signal CK from an external quartz oscillator 6, and a time measurement counter 8 (CNT) clocked by clock signal CK. Unlike circuit 2, circuit 10 comprises another counter 12 (CNT2) clocked by an oscillator 14 internal to circuit 10. The frequency of oscillator 14 is described hereafter. Oscillator 14 is, for example, formed by an odd number of inverters 15 connected in an oscillating loop. A first comparator 16 (INIT) is arranged to receive content CNT of counter 8, and to reset counter 12 each time counter 8 contains a predetermined value N1. A comparator 18 (ALERT) is arranged to compare the content of counter 12 to a second predetermined value N2, and to provide block 4 with an alert signal when the content of counter 12 exceeds value N2.

The counter 12, clocked by internal oscillator 14, measures that the frequency of signal CK does not fall beyond a given threshold frequency. Calling T the real or current period of signal CK, comparator 16 resets counter 12 with a period equal to T.N1. Comparator 18 provides an alert signal to block 4 if counter 12 contains a value N2, that is, after counter 12 has counted, without being interrupted, for a duration equal to T2.N2, where T2 is the period of oscillator 14.

Calling T1 the nominal period of signal CK, corresponding to the frequency of signal CK provided to start block 4, and for a given period T2, values N1 and N2 are, according to the present invention, selected so that T1.N1<T2.N2. Thus, as long as period T of signal CK remains smaller than T2.N2/N1, counter 12 is always reset by comparator 16 before reaching value N2 and comparator 18 never generates the alert signal. If however, the frequency of signal CK is reduced and period T of signal CK is such that T is greater than T2.N2/N1 (for example, in the case where a pirate reduces the external frequency between two uses of the circuit), then counter 12 will reach value N2 before being reset by comparator 16, and comparator 18 will generate the alert signal. Block 4 may be provided for, upon reception of the alert message, forbidding the reading of the memorized file, transmitting an error signal, or implementing any appropriate action. Of course, the conventional function of block 4 of monitoring the state of counter 8 to detect an exceeding of the closing date is, preferably, always present.

Those skilled in the art should note that the closer to each other values T1.N1 and T2.N2 are selected, the smaller variation of the frequency of signal CK is enabled to be detected by the circuit 10.

In practice, value T1.N1 may be substantially smaller than value T2.N2 to tolerate some increase of T1 before the alert signal is generated. Calling T1' the period of signal CK from which the alert signal is desired to be generated, the foregoing results in that values N1 and N2 will be selected so that T1'.N1>T2.N2, while verifying the prior inequality T1.N1<T2.N2.

Counter 12, comparators 16 and 18, and internal oscillator 14 thus enable detection of a reduction in frequency, especially for pirating reasons, of clock signal CK.

Comparators 16 and 18 and oscillator 14 are integrated in circuit 10, which makes their modification or deactivation delicate, or even impossible, and is an advantage of the circuit 10.

Other advantages are that counter 12, comparators 16 and 18, and oscillator 14 are simple to implement, that they take up a reduced surface area in integrated circuit 10, and have a negligible power consumption.

In practice, it is difficult to know the period of an internal oscillator such as oscillator 14 with a great accuracy. Period T2 of oscillator 14 especially depends on variations in the manufacturing process of integrated circuit 2 and on the circuit operating temperature. Thus, period T2 ranges between a minimum value T2' and a maximum value T2", the difference between periods T2' and T2" being, for example, 20%. Preferably, values N1 and N2 will be selected so that T1.N1<T2'.N2 and T1'.N1>T2".N2.

Figure 3:
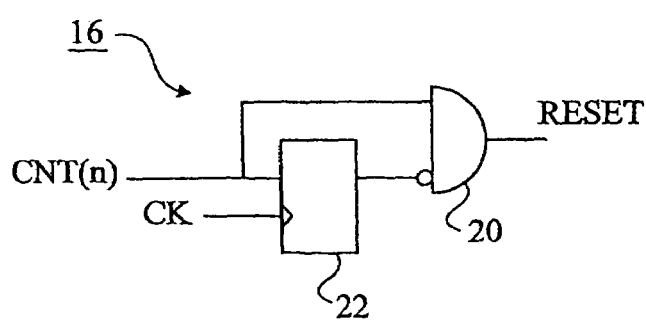
FIG. 3 shows an embodiment of comparator 16 of FIG. 2.

FIG. 3 shows a particularly advantageous embodiment of comparator 16, in a case where value N1 is selected to be equal to an n power of 2. Comparator 16 is in such a case reduced to a device providing a reset signal RESET of counter 12 at each change of bit of rank n of counter 8. Comparator 16 comprises an AND gate 20 receiving on a first input bit CNT(n) of rank n of counter 8 and on a second input the inverse of the output of a D flip-flop 22 clocked by signal CK and receiving said bit CNT(n) as an input. The output of gate 20 generates a high active reset signal RESET of counter 12. Comparator 18 may also have a similar structure if value N2 is a power of 2.

Of course, the present invention is likely to have various alterations, modifications, and improvements which will readily occur to those skilled in the art. In particular, the present invention has been described in relation with a counter 8, the content of which is used to measure time, but those skilled in the art will readily adapt the present invention to a down counter in which a value corresponding to the duration of the right is loaded, the right existing as long as the down counter contains a non-zero value.

Further, the present invention has been described in relation with time rights relative to a reading of a music file containing its closing date, but those skilled in the art will readily adapt the present invention to any time right relative to the use of a digital file of another type and to any other time right inscribed in the digital file or communicated to the circuit by any other means.

Moreover, the present invention has been described in relation with an internal oscillator 14 formed of an odd number of loop-connected inverters, but those skilled in the art will readily adapt the present invention to any appropriate type of internal oscillator, for example, an LC- or RC-type oscillator.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An integrated circuit comprising:
   a first counter clocked by a clock signal having a nominal first period and provided by an oscillator external to the circuit;
   a second counter clocked at a second period by an oscillator internal to the circuit, the second counter being reset each time the first counter reaches a first predetermined value; and
   means for activating an alert signal when the second counter reaches a second predetermined value such that the product of the second predetermined value by the second period is greater than the product of the first predetermined value by the first period.

2. The integrated circuit of claim 1 wherein the alert signal is activated when an actual period of the clock signal is greater than a threshold period, the product of the second predetermined value by the second period being smaller than the product of the first predetermined value by the threshold period.

3. The integrated circuit of claim 2 wherein the second period ranges between a lower limit and an upper limit, the product of the second predetermined value by the lower limit being greater than the product of the first predetermined value by the first period and the product of the second predetermined value by the upper limit being smaller than the product of the first predetermined value by the threshold period.

4. The circuit of claim 1 wherein the internal oscillator is formed of an odd number of series-connected inverters including a last inverter having an output connected to an input of a first one of the inverters.

5. The circuit of claim 1, further comprising a comparator that resets the second counter by generating a reset signal each time the first counter reaches the first predetermined value.

6. The circuit of claim 5 wherein the first predetermined value is $2^n$, and wherein the comparator comprises:
   an AND gate having a first input that receives a bit of rank n of the first counter, an inverting second input, and an output that generates the reset signal; and
   a D flip-flop clocked by the external oscillator and receiving said bit of rank n as an input, the D flip-flop having an output connected to the second input of the AND gate.

7. The circuit of claim 1, further comprising a functional block that enables implementation of a predetermined function until the first counter reaches a predetermined limit, or until the alert signal is activated.

8. A method of time measurement using a counter provided to be clocked at a nominal first period by an oscillator, comprising the steps of:

clocking a second counter at a second period, the second counter being provided to be reset each time the first counter reaches a first predetermined value; and
activating an alert signal when the second counter reaches a second predetermined value such that the product of the second predetermined value by the second period is greater than the product of the first predetermined value by the first period.

9. The method of claim 8 wherein the alert signal is activated when an actual period of the clock signal is greater than a threshold period, the product of the second predetermined value by the second period being smaller than the product of the first predetermined value by the threshold period.

10. The method of claim 9 wherein the second period ranges between a lower limit and an upper limit, the product of the second predetermined value by the lower limit being greater than the product of the first predetermined value by the first period and the product of the second predetermined value by the upper limit being smaller than the product of the first predetermined value by the threshold period.

11. The method of claim 8 wherein resetting the second counter includes:
    clocking a D flip-flop using the oscillator;
    receiving a bit of rank n of the first counter at an input of the D flip-flop;
    receiving the bit of rank n at a first input of an AND gate;
    receiving an output of the D flip-flop at an inverting second input of the AND gate; and
    providing a reset signal from an output of the AND gate to the second counter in response to the bit of rank n switching logic states.

12. The method of claim 8, further comprising ending implementation of a predetermined function in response to the first counter reaching a predetermined limit, or the alert signal being activated.

13. A method for managing a time-limited right of implementation of a predetermined function, the method comprising:
    time using a counter provided to be clocked at a nominal first period by an oscillator;
    clocking a second counter at a second period, the second counter being provided to be reset each time the first counter reaches a first predetermined value;
    activating an alert signal when the second counter reaches a second predetermined value such that the product of the second predetermined value by the second period is greater than the product of the first predetermined value by the first period; and
    causing the implementation of the predetermined function to end in response to the first counter reaching a predetermined limit, or the alert signal being activated.

14. An integrated circuit for determining that a first clock signal, output by an external oscillator, has obtained a threshold first period that is greater than a nominal first period of the external oscillator, the integrated circuit comprising:
    a first counter having a clock output and a clock input that receives the first clock signal;
    an internal oscillator having an output that provides a second clock signal having a second period;
    a second counter having a clock input coupled to the output of the internal oscillator, a reset input coupled to the first counter; and an output, the second counter being reset each time the output of the first counter reaches a first predetermined value; and a comparator having an input coupled to the output of the second counter and an output that activates an alert signal when the second counter reaches a second predetermined value, the second predetermined value being greater than the first predetermined value multiplied by the nominal first period and divided by the second period.

15. The integrated circuit of claim 14 wherein the second period ranges between a lower limit and an upper limit, the second predetermined value being greater than the first predetermined value multiplied by the nominal first period divided by the lower limit, and the second predetermined value being smaller than the first predetermined value multiplied by the threshold first period divided by the upper limit.

16. The integrated circuit of claim 14 wherein the internal oscillator is formed of an odd number of series-connected inverters including a last inverter having an output connected to an input of a first one of the inverters.

17. The integrated circuit of claim 14, further comprising an additional comparator connected between the output of the first counter and the reset input of the second counter, the additional comparator being structure to reset the second counter by generating a reset signal each time the output of the first counter reaches the first predetermined value.

18. The integrated circuit of claim 17 wherein the first predetermined value is $2^n$, and wherein the additional comparator comprises:
   an AND gate having a first input that receives a bit of rank n of the first counter, an inverting second input, and an output that generates the reset signal; and
   a D flip-flop clocked by the external oscillator and receiving said bit of rank n as an input, the D flip-flop having an output connected to the second input of the AND gate.

19. The circuit of claim 14, further comprising a functional block coupled to the first counter and the comparator and structured to end implementation of a predetermined function in response to the output of the first counter reaching a predetermined limit, or the alert signal being activated.

20. The method of claim 13 wherein the alert signal is activated when an actual period of the clock signal is greater than a threshold period, the product of the second predetermined value by the second period being smaller than the product of the first predetermined value by the threshold period.

21. The method of claim 20 wherein the second period ranges between a lower limit and an upper limit, the product of the second predetermined value by the lower limit being greater than the product of the first predetermined value by the first period and the product of the second predetermined value by the upper limit being smaller than the product of the first predetermined value by the threshold period.

22. The method of claim 13 wherein resetting the second counter includes:
   clocking a D flip-flop using the oscillator;
   receiving a bit of rank n of the first counter at an input of the D flip-flop;
   receiving the bit of rank n at a first input of an AND gate;
   receiving an output of the D flip-flop at an inverting second input of the AND gate; and
   providing a reset signal from an output of the AND gate to the second counter in response to the bit of rank n switching logic states.

* * * * *